United States Patent
Singh

(10) Patent No.: US 10,944,769 B2
(45) Date of Patent: Mar. 9, 2021

(54) INTRUSION DETECTION ON LOAD BALANCED NETWORK TRAFFIC

(71) Applicant: ORACLE INTERNATIONAL CORPORATION, Redwood Shores, CA (US)

(72) Inventor: Brijesh Singh, Mercer Island, WA (US)

(73) Assignee: Oracle International Corporation, Redwood Shores, CA (US)

( * ) Notice: Subject to any disclaimer, the term of this patent is extended or adjusted under 35 U.S.C. 154(b) by 117 days.

(21) Appl. No.: 16/140,957

(22) Filed: Sep. 25, 2018

(65) Prior Publication Data

US 2020/0099703 A1 Mar. 26, 2020

(51) Int. Cl.
*H04L 29/06* (2006.01)
*H04L 9/32* (2006.01)
*H04L 29/08* (2006.01)

(52) U.S. Cl.
CPC ........ *H04L 63/1416* (2013.01); *H04L 9/3268* (2013.01); *H04L 63/0281* (2013.01); *H04L 63/0478* (2013.01); *H04L 67/1002* (2013.01)

(58) Field of Classification Search
CPC ............... H04L 63/1416; H04L 9/3268; H04L 63/0281; H04L 63/0478
See application file for complete search history.

(56) References Cited

U.S. PATENT DOCUMENTS

| | | | |
|---|---|---|---|
| 7,657,940 B2 | 2/2010 | Portolani et al. | |
| 7,895,652 B2 | 2/2011 | Kolton et al. | |
| 10,257,033 B2 * | 4/2019 | Shimamura | H04L 41/5045 |
| 10,263,947 B2 * | 4/2019 | Vats | H04L 61/1552 |

(Continued)

FOREIGN PATENT DOCUMENTS

| | | |
|---|---|---|
| CN | 101141243 A | 3/2008 |
| WO | 2015070260 A1 | 5/2015 |

OTHER PUBLICATIONS

Steve Piper, Introducing SSL Visibility Appliances, Encrypted Traffic Management for Dummies, Copyright 2015, pp. 1-52, published by John Wiley & Sons, Inc., Hoboken, NJ 2015, downloaded from: https://www.symantec.com/content/dam/symantec/docs/other-resources/encrypted-traffic-management-for-dummies.pdf.

(Continued)

*Primary Examiner* — Oleg Korsak
(74) *Attorney, Agent, or Firm* — Kraguljac Law Group, LLC

(57) ABSTRACT

Systems, methods, and other embodiments associated with performing intrusion detection on load balanced network traffic are described. In one embodiment, a method includes receiving, at a load balancer host, an encrypted data packet from a remote computer. A certificate established between the remote computer and a destination service being accessed by the remote computer is used by the load balancer host to decrypt the encrypted data packet to create an unencrypted data packet. The unencrypted data packet is routed to an intrusion detection system at the load balancer host. The intrusion detection system is controlled to execute intrusion detection upon the unencrypted data packet. A secure connection is established with the destination computing node. The unencrypted data packet is re-encrypted and transmitted over the network using the secure connection to the destination computing node.

17 Claims, 11 Drawing Sheets

(56) References Cited

U.S. PATENT DOCUMENTS

| | | | |
|---|---|---|---|
| 10,505,941 B2* | 12/2019 | Vats | H04L 67/1095 |
| 10,530,578 B2* | 1/2020 | Keshava | G06F 21/604 |
| 2006/0095969 A1* | 5/2006 | Portolani | H04L 67/1002 |
| | | | 726/23 |
| 2006/0112208 A1 | 5/2006 | Accapadi et al. | |
| 2007/0255802 A1 | 11/2007 | Aloni et al. | |
| 2008/0225705 A1 | 9/2008 | Janarthanan et al. | |
| 2012/0250682 A1 | 10/2012 | Vincent et al. | |
| 2015/0067191 A1 | 3/2015 | Makhervaks et al. | |
| 2016/0112313 A1 | 4/2016 | Niu | |
| 2016/0119374 A1 | 4/2016 | Williams et al. | |
| 2017/0070531 A1 | 3/2017 | Huston, III et al. | |

OTHER PUBLICATIONS

Yousef Bakhdlaghi, Snort and SSL/TLS Inspection, from SANS Institute InfoSec Reading Room, Apr. 14, 2017, pp. 1-24, downloaded from: https://www.sans.org/reading-room/whitepapers/detection/snort-ssl-tls-inspection-37735.

US Patent and Trademark Non-Final Office Action in Co-pending U.S. Appl. No. 16/100,309, filed Aug. 10, 2018, notification date of Oct. 24, 2019.

* cited by examiner

INTRUSION DETECTION ON LOAD BALANCED NETWORK TRAFFIC

BACKGROUND

Many network computing environments comprise load balancers. The load balancers are configured to balance network traffic amongst computing nodes of a network computing environment. Each computing node may be capable of executing services that are requested by remote client devices. Such services could correspond to storage services, application hosting services, email services, etc. When a request for access to a service is received by a computing node hosting a load balancer, the load balancer determines which computing node should process the request. The determination can be made based upon available resources of each computing node, such that the request is routed to a computing node with relatively more available computing resources. In this way, network traffic is balanced amongst the computing nodes of the network computing environment.

Remote client computers can establish service level agreements (SLAs) with the network computing environment. A service level agreement can specify that all network traffic communicated between a remote client computer and a destination computing node must stay encrypted during transmission between computing nodes. For example, secure socket layer (SSL) is a protocol that can be used to establish encryption links between the remote client computer and the destination computing node. For example, the remote client computer encrypts and transmits encrypted data packets over the network to the network computing environment. The load balancer receives the encrypted data packets and forwards the encrypted data packets to the destination computing node that will process the encrypted data packets. The destination computing node decrypts and processes the encrypted data packets. In this way, the data packets are always encrypted during transmission "over the wire" between the remote computing device and computing nodes of the network computing environment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1A:
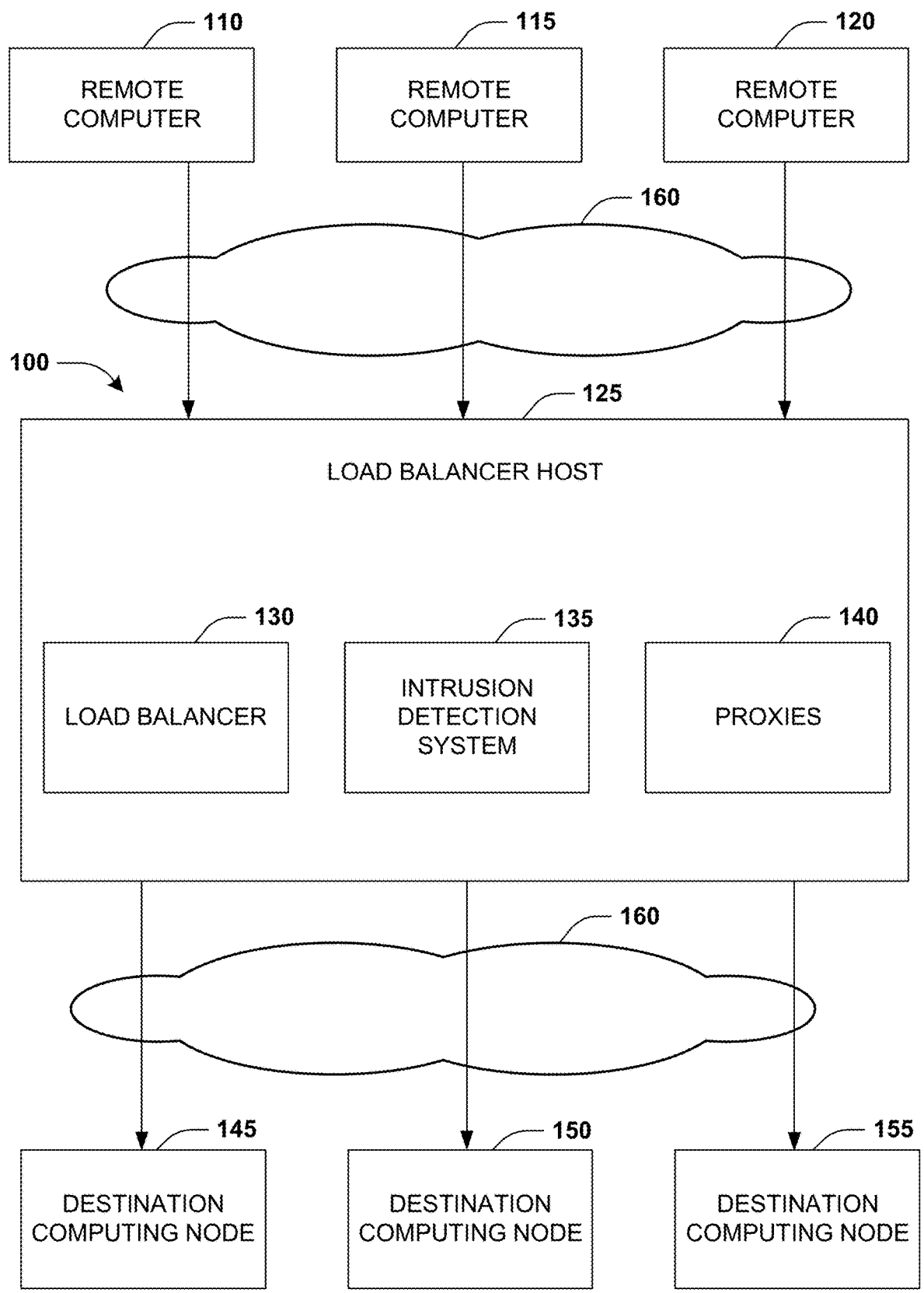
FIG. 1A illustrates an embodiment of a system that performs intrusion detection on load balanced network traffic.

The main purpose of conventional load balancers is to balance network traffic load amongst computing nodes (service nodes hosting services) of a network computing environment. A load balancer also hides a service host layout details from clients. For example, a client will see a load balancer IP of the load balancer as a service IP of a service being accessed by the client. Upon receiving a client request from the client to access the service, the load balancer terminates the client request. The load balancer will then issue a new request to one of the service nodes on the client's behalf and then sends a reply from the service node back to the client. This technique allows a network computing environment to scale in a manageable way and to protect services behind the load balancer.

In some instances, load balancers also provide encryption service (SSL/TLS). For example, the load balancer is configured to receive SSL encrypted traffic. The load balancer will perform SSL termination so that the load balancer can decrypt the request and forward the request to the service host. A reply from the service node is received by the load balancer. The reply is encrypted and sent back to the client. This allows the service behind the load balancer to support secure communication without managing certificates.

In more secure environments where compliance requires all communication over the wire to be encrypted, the load balancer terminates SSL but also communicates with service nodes, behind load balancer, over a secure communication channel (SSL/TLS). Maintaining encryption of data packets during transmission between computing nodes will improve security provided by the network computing environment.

Security of the network computing environment can also be improved by implementing intrusion detection. Intrusion detection is performed to monitor for malicious activity and policy violations. In one example, intrusion detection is performed to detect malicious patterns of network activity, such as behavior of malware. In another example, intrusion detection is performed to detect deviations of network activity from a model of normal/good network activity. This type of intrusion detection employs machine learning to construct and update the model. In another example, intrusion detection matches network traffic with known patterns of network attacks. Other types of intrusion detection can be implemented, such as signature based intrusion detection, statistical anomaly intrusion detection, or stateful protocol analysis detection.

Performing intrusion detection improves security and protects against attacks on the network computing environment. Security is improved because a malicious computer can be blocked from further access to the network computing environment. Such access is blocked by modifying operation of the load balancer or other network equipment to block incoming data packets from the malicious remote computer.

Intrusion detection cannot be performed on encrypted data packets. Intrusion detection systems work best by listening to all traffic moving past its interface and comparing that traffic with rules for legitimate and illegitimate communications. When the intrusion detection system encounters encrypted traffic, the only analysis that can be performed is packet level analysis. Application layer analysis cannot be performed because the application layer contents are inaccessible due to encryption. Thus, attackers hide malicious code in the encrypted application layer. Assuming that networks are primarily targeted against network services (the application layer entities), packet level analysis ends up doing very little to protect against intrusion.

Accordingly, encrypted data packets would have to be unencrypted before intrusion detection can be performed. The intrusion detection system may not have access to certificates established between remote computers and destination computing nodes for encrypting and decrypting network traffic. In this case, there is no way to provide for intrusion detection for load balanced network traffic that maintains encryption during transmission between computing nodes. Having to first decrypt and then transmit decrypted data packets to the intrusion detection system on a different host exposes the network computing environment to security risks, network attacks, and policy violations. Even if the intrusion detection system is provided with certificates for encrypted and decrypting network traffic, decryption is computationally intensive. This places an extra computational burden upon the intrusion detection system, where the load balancer is already decrypting data traffic.

In sum, conventional load balancers do not do intrusion detection because they are merely configured to load balance and forward data packets through the network computing environment. In order to implement intrusion detection for the network computing environment, a conventional load balancer must transmit the data packets to a separate intrusion detection system. This results in multiple transmissions of data packets through the network computing environment, which consumes network bandwidth and increases latency of processing data packets. There is also an increased cost and operational overhead to separately maintain additional hardware to perform intrusion detection. Furthermore, if the data packets are encrypted, then the intrusion detection system will be unable to adequately perform intrusion detection.

As provided herein, computerized systems and methods are described that provide for intrusion detection on load balanced network traffic. In one embodiment, the present system controls a single load balancing host of a network of computing nodes to perform intrusion detection in combination with load balancing of encrypted network traffic. The present system improves existing technological processes for load balancing by controlling the single load balancer host to perform a combination of intrusion detection and load balancing upon secure network traffic. The present system overcomes technical challenges associated with combining intrusion detection and load balancing of secure network traffic. In particular, the present system keeps data packets encrypted during transmission over the network between computing nodes in order to maintain secure network traffic. Encryption and decryption is performed by remote client computers and destination computing nodes of the network computing environment using certificates. This presents a technical challenge for implementing intrusion detection upon the encrypted data packets. This is because intrusion detection cannot be adequately performed on encrypted data packets and the certificates are not conventionally provided to the load balancer.

The present system overcomes this technical challenge of being unable to perform intrusion detection upon the encrypted data packets. To overcome this technical challenge, in one embodiment, a load balancer host is controlled to decrypt data packets, perform intrusion detection upon the decrypted data packets, re-encrypt the decrypting data packets, and load balance and transmit the re-encrypted data packets to a destination computing node. These actions are all performed within the same load balancer host so that all data packets received by the load balancer host and packets transmitted over the network by the load balancer host are always encrypted. The data packets are in a decrypted state only within the load balancer host and are not transmitted to another device in a decrypted state.

Locally performing intrusion detection and load balancing at the load balancer enhances security. Security is enhanced because intrusion detection is performed as data packets are received at the network computing environment by the load balancer host as opposed to after data packets have already been routed by the load balancer host through the network computing environment. Furthermore, network bandwidth is reduced because data packets do not need to be routed to a separate intrusion detection system residing on a separate computing node. This also reduces the costs associated with maintaining additional hardware to separately implement the intrusion detection system.

With reference to FIG. 1A, one embodiment of a system 100 is illustrated that is configured to perform intrusion detection on load balanced network traffic. A more detailed description is provided with reference to FIG. 2. The system 100 is implemented as a load balancer host 125. The load balancer host 125 may be part of a network of computing nodes. The network of computing nodes comprises, for example, the load balancer host 125, a destination computing node 145, a destination computing node 150, a destination computing node 155, and/or other computing nodes connected over a network 160. The network of computing nodes are configured to host services accessible to remote computers over the network 160. Such services can correspond to application hosting services, software as a service (SaaS), network storage, email services, and a wide variety of other software applications and computer implemented services. A remote computer 110, a remote computer 115, a remote computer 120, and/or other remote computers can access the services hosted by the computing nodes.

Figure 1B:
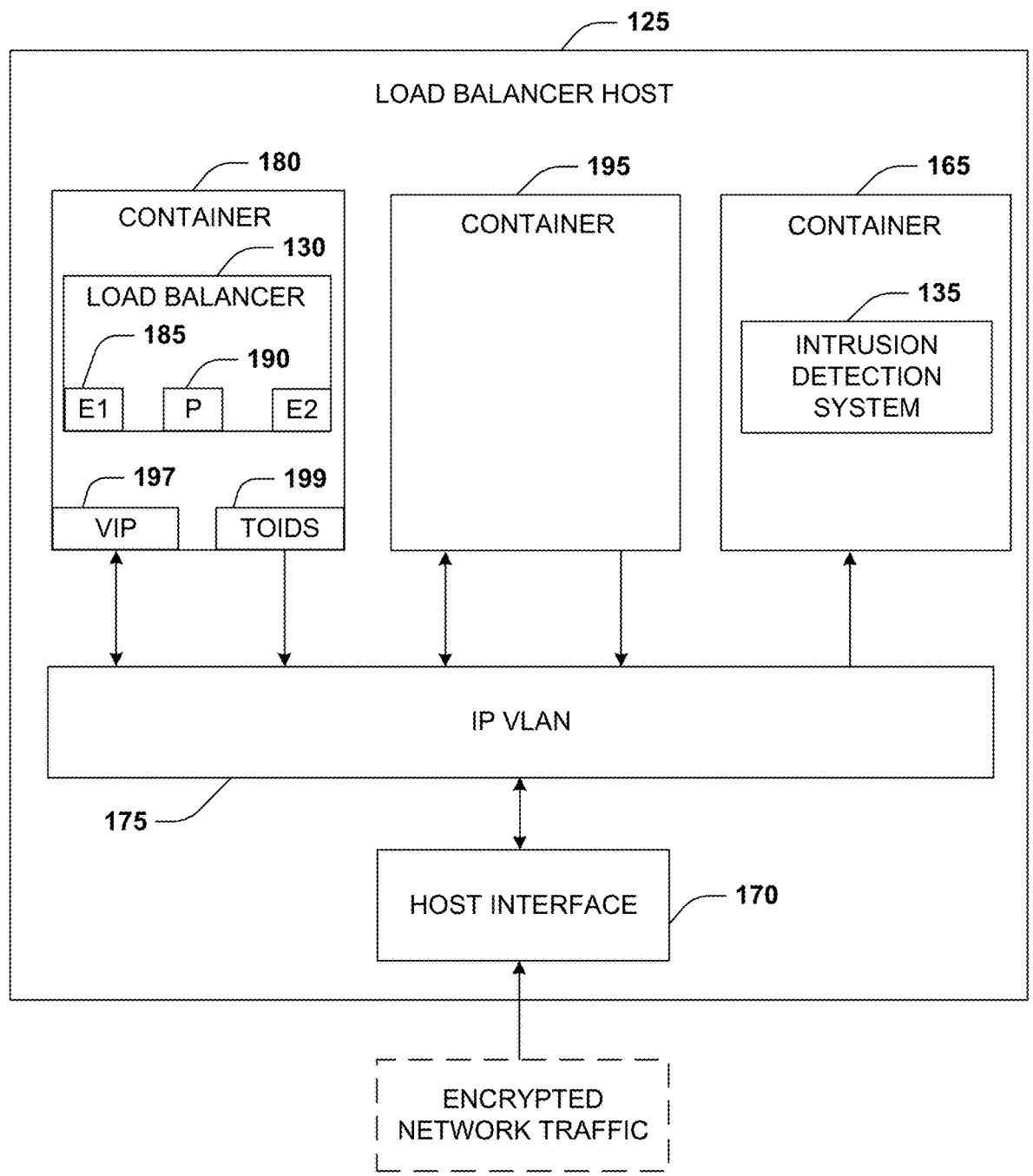
FIG. 1B illustrates an embodiment of a system that performs intrusion detection on load balanced network traffic.

The load balancer host 125 is a host computing node that hosts load balancers within containers, as illustrated in FIG. 1B. In particular, the load balancer host 125 runs/executes containers that are execution environments, such as virtual machines and/or web servers. Load balancers, intrusion detection systems, and/or other applications/systems can be executed by the execution environments of each container. In one embodiment, a load balancer 130 is hosted within a container 180, a second load balancer is hosted within a container 195, and an intrusion detection system 135 is hosted within a container 165.

The load balancer host 125 comprises a host interface 170 that is configured to receive encrypted network traffic from remote computers (clients). Communication between the host interface 170 and the containers and communication between the containers is performed by container networking implemented as an IP virtual LAN (IP vlan) 175. When encrypted traffic arrives at the host interface 170, the encrypted traffic is forwarded to a destination container by the IP vlan 175 based upon a destination IP of the encrypted traffic. For example, encrypted traffic is routed to the load balancer 130 based upon the encrypted traffic corresponding to a virtual IP (VIP) interface 197 of the container 180. The encrypted traffic is received over an SSL connection (E1) 185 by a web server executing within the container 180. The web server terminates the SSL encryption for the encrypted traffic, and forwards the traffic to a port (P) 190. The load balancer 130 listens to port (P) 190 for traffic to load balance. The load balancer 130 is also able to communicate with the destination computing nodes 150 using SSL.

An IP table rule is executed to match traffic destined for port (P) 190. The IP table rule will mirror the traffic through a toids vlan interface 199. The toids vlan interface 199 is used to transmit unencrypted traffic over the IP vlan 175 to the container 165 hosting the intrusion detection system 135. Any unencrypted traffic forwarded to the toids vlan interface 199 is forwarded to the container 165. Because the unencrypted traffic is internally routed within the load balancer host 125 over the internal IP vlan 175, the unencrypted traffic is not being transmitted over the network 160 between computing nodes. Thus, security (encryption over the wire) is maintained. Also, the intrusion detection system 135 within the container 165 is able to perform intrusion detection upon the unencrypted traffic because it is not encrypted. The load balancer 130 will execute load balancing functionality and utilize a proxy to establish a new different secure SLL connection with a destination computing node that is a destination of the encrypted traffic.

Referring back to FIG. 1A, the load balancer host 125 is configured to load balance and distribute network traffic amongst the computing nodes of the network using the load balancer 130 within the container 180. In one embodiment, the load balancer 130 determines that the remote computer 110 is requesting access to an email service. For example, encrypted network traffic is received by the host interface 170 and is routed over the IP vlan 175 to the container 180 at the VIP interface 197. The load balancer 130 assesses current loads of the destination computing node 145, the destination computing node 150, the destination computing node 155, and other computing nodes capable of executing the email service for access by the remote computer 110. The load balancer 130 may determine that the destination computing node 150 has more available resources and lower load than the other computing nodes. Thus, the load balancer 130 routes data packets associated with the remote computer 110 accessing the email service to the destination computing node 150. In this way, the load balancer 130 balances network traffic amongst the computing nodes.

Once the load balancer 130 determines that the remote computer 110 will access the email service through the destination computing node 150, a secure connection is established. In one embodiment, the secure connection is a secure socket layer (SSL) established between the remote computer 110 and the destination computing node 150 through the network of computing nodes or with the load balancer host 125. The remote computer 110 and the destination computing node 150 (or the load balancer host 125) create certificates used to encrypt and decrypt data packets transmitted over the secure connection. The load balancer 130 is provided with access to the certificates so that the load balancer 130 can decrypt and re-encrypt data packets.

The load balancer host 125 is configured to control the intrusion detection system 135 executing in the container 165. The load balancer host 125 controls the intrusion detection system 135 to perform intrusion detection upon data packets received from the remote computers. In one embodiment, an encrypted data packet is received by the host interface 170 and is routed over the IP vlan 175 to the container 180 at the VIP interface 197. The web server within the container 180 receives the encrypted data packet and terminates the SSL connection to create a decrypted data packet that is forwarded to the port (P) 190. The load balancer 130 listens to port (P) 190 to obtain the decrypted data packet that will be load balanced, re-encrypted, and transmitted to the destination computing node 150 over the network 160.

The decrypted data packet is mirrored by the IP table rule from port (P) 190 through the toids vlan interface 199 for transmission over the IP vlan 175 to the intrusion detection system 135 executing in the container 165 within the load balancer host 125. It may be appreciated that the unencrypted data packet is not transmitted over the network 160, and thus no unsecure/unencrypted data packet transmission occurs between computing nodes. The load balancer host 125 controls the intrusion detection system 135 to perform intrusion detection upon the unencrypted data packet.

The intrusion detection system 135 is controlled to perform various types of intrusion detection to determine if the unencrypted data packet corresponds to safe activity or malicious activity. In one embodiment, the unencrypted data packet is part of a flow of data packets between the remote computer 110 and the destination computing node 150. The flow of data packets correspond to the transmission of data associated with the remote computer 110 accessing the email service hosted by the destination computing node 150. The intrusion detection system 135 compares content of the flow, such as the unencrypted data packet, to predefined patterns of safe content and malicious content to determine whether the unencrypted data packet corresponds to malicious activity or safe activity. Safe activity may correspond to expected/routine types of access to the email service, such as routine access from similar locations at similar times. Malicious activity may correspond to unexpected types of access to the email service, such as sending a large number of emails in a short period of time, access from unexpected/far off locations during the night, etc. If the unencrypted data packet corresponds to malicious activity, then operation of the load balancer host 125 is controlled to block the remote computer 115 from further access to the network of computing nodes.

In one embodiment, along with performing load balancing and intrusion detection at the load balancer host 125, the load balancer host 125 controls proxies 140 to transmit secure traffic to destination computing nodes of the network. The proxies 140 are located at the load balancer host 125. There is one proxy for each destination computing node of the network of computing nodes. In one embodiment, the load balancer host 125 controls a proxy associated with the destination computing node 150 to establish a new secure connection with the destination computing node 150. That is, the prior secure connection established between the remote computer 115 and the destination computing node 150 was terminated by the web server in order to decrypt the encrypted data packet. Thus, the proxy creates a new secure connection with the destination computing node 150 so that the unencrypted data packet can be re-encrypted and transmitted over the network 160 in an encrypted state. The proxy is controlled to encrypt the unencrypted data packet using a certificate of the secure connection to create a re-encrypted data packet. The load balancer host 125 controls the proxy to transmit the re-encrypted data packet over the network 160 to the destination computing node 150 for processing by the email service. It may be appreciated that the load balancer 130 performs the functionality of the proxy, such as to establish a new secure SSL connection with a destination computing node.

The present system 100 provides load balancing, intrusion detection, and secure transmission over the network 160 by a single load balancer host 125 of the network of computing nodes. The ability to perform intrusion detection at the same load balancer host 125 that receives and load balances data packets from remote computers will enhance security. Security is enhanced because malicious activity can be detected upfront as data packets are received and load balanced before malicious data packets are further routed through the network 160. Also, hardware and maintenance costs are reduced because the intrusion detection is implemented at the same load balancer host 125 performing the load balancing. That is, there is no need to maintain a separate computing node to host the intrusion detection system because the intrusion detection system 135 is hosted within the container 165 incorporated into the load balancer host 125. Further, network bandwidth is reduced because data packets are not being sent to the separate computing node that would be hosting the intrusion detection system. Because prior intrusion detection systems are not configured to encrypt and decrypt secure client traffic, the data packets, in these prior systems, would have to be decrypted and transmitted over the network 160 in an unencrypted state to the separate computing node. This would greatly reduce security and would violate service level agreements specifying that data packets must remain encrypted when being transmitted over the network 160 between computing nodes.

Figure 2:
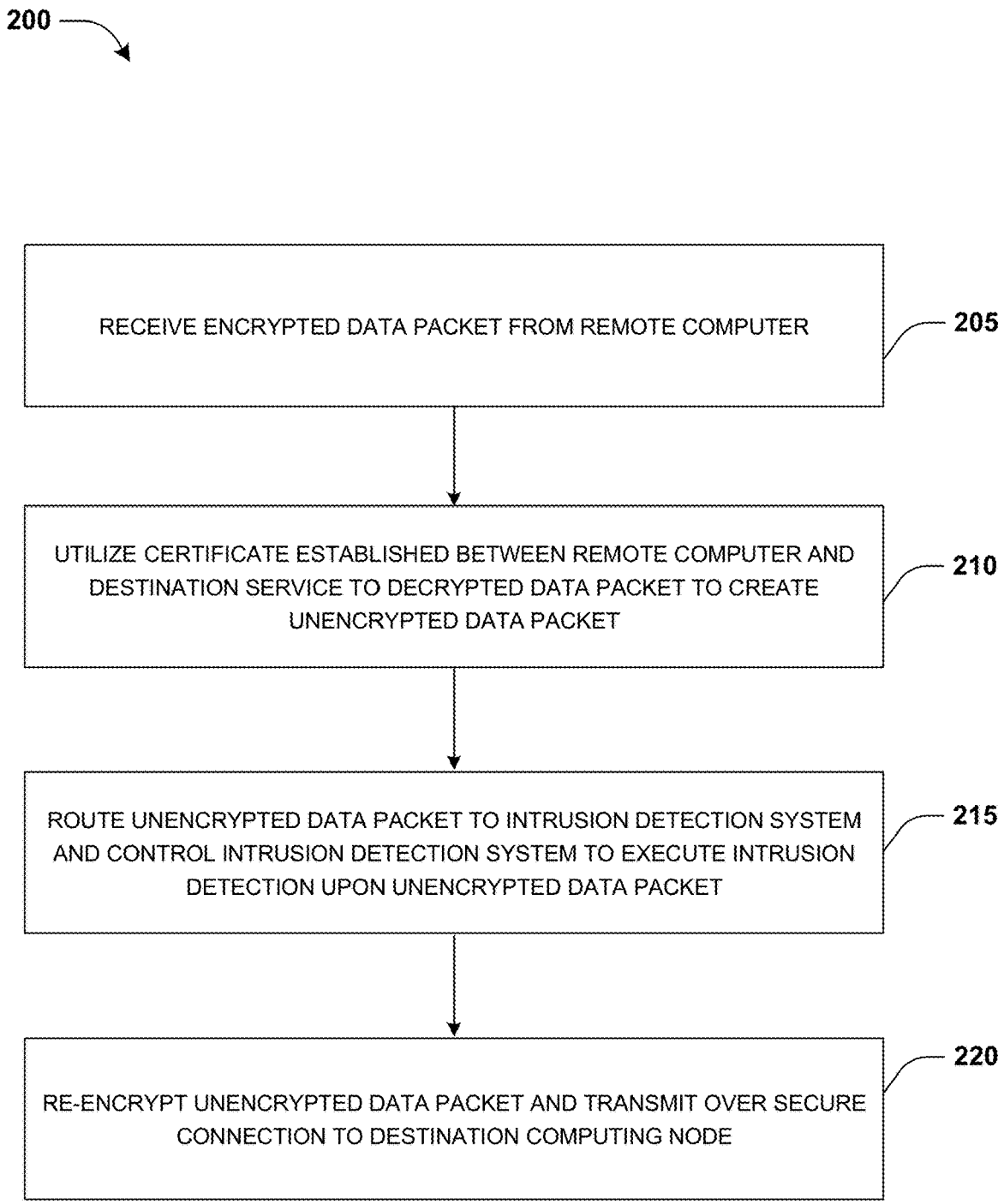
FIG. 2 illustrates an embodiment of a method that performs intrusion detection on load balanced network traffic.

With reference to FIG. 2, one embodiment of a computer implemented method 200 that is associated with performing intrusion detection on load balanced network traffic is illustrated. In one embodiment, the method 200 is performed by a load balancer host 315 and system 300 of FIGS. 3A-3D utilizing various computing resources of the load balancer host 315. In one embodiment, the load balancer host 315 is a computer that is configured as a special purpose machine to implement the disclosed features in one or more combinations, and/or other computers similarly configured. The computing resources, such as a processor, are used for executing instructions associated with load balancing, encrypting and decrypting client traffic, and intrusion detection. Memory and/or disks are used for storing load balancing executable code, intrusion detection executable code, and proxies. A network device is used for receiving and transmitting secure client traffic over a network 310. The method 200 is triggered upon initialization of the load balancer host 315, such as for performing load balancing of network traffic.

The load balancer host 315 is part of a network of computing nodes that provide remote computers with access to services hosted by the computing nodes. In one embodiment, the network of computing nodes comprises a multi-tenant computing environment or other service hosting environment accessible to the remote computers over a network 310. Clients can use remote computers to access the multi-tenant computing environment for executing services subscribed to by the clients. Such services can correspond to application hosting services, application development services, calendar services, analytic services, etc. Each computing node is capable of executing services for access by the clients. For example, in response to a request from a remote computer to access a service, a corresponding destination computing node will host the service. In one embodiment, executable code of the service is executed through a virtual machine hosted by the destination computing node. The remote computer is provided with access to the execution of the service, such as access to an email account provided by an email service.

In one embodiment, the load balancer host 315 enforces a service level agreement for a remote computer 305. The service level agreement specifies that data packets transmitted over the network 310 between the remote computer 305 and the computing nodes must remain encrypted during transmission over the network 310. Thus, the load balancer host 315 will implement load balancing functionality upon network traffic such that the network traffic maintains encryption during transmission over the network 310. The load balancing functionality is executed by load balancer 320 executing within a container of the load balancer host 315.

The load balancer host 315 is configured with a front end internet protocol (IP) address. The front end IP address is used to receive encrypted data packets from remote computers. In one embodiment, the remote computer 305 requests access to a service hosted by the network computing environment. The remote computer 305 transmits the request to the front end IP address. In this way, the load balancer host 315 receives the request at the front end IP address. The load balancer host 315 performs load balancing and determines that one of the destination computing nodes (e.g., the destination computing node 335) has available resources to host the service for the remote computer 305. Accordingly, the remote computer 305 and the destination computing node 335 establish a secure connection for communicating data packets associated with the remote computer 305 accessing the service.

In one embodiment, the secure connection establishes a secure socket layer (SSL) session and establishes certificates that can be used to encrypt and decrypt data packets. The certificates can be used by the remote computer 305 to encrypt data packets. The encrypted data packets are transmitted through the network of computing nodes to the destination computing node 335 for processing. The certificates are provided to the load balancer host 315 so that the load balancer host 315 can decrypt such data packets.

Figure 3A:
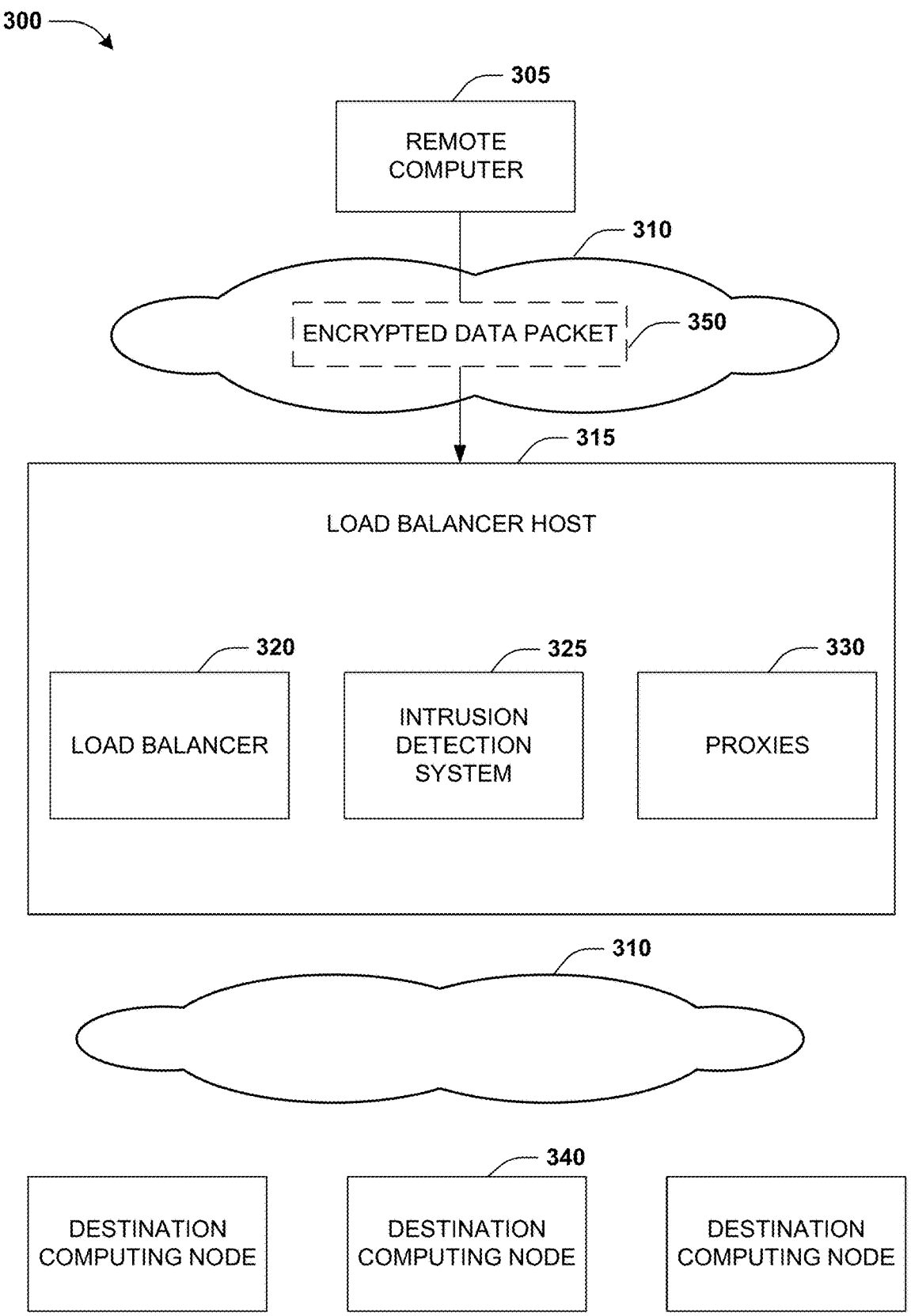
FIG. 3A illustrates an embodiment of a system that performs intrusion detection on load balanced network traffic, where an encrypted data packet is received.

At 205, the load balancer host 315 receives an encrypted data packet 350 from the remote computer 305 over the network 310, as illustrated by FIG. 3A. In one embodiment, the encrypted data packet 350 is received at the front end IP address of the load balancer host 315. In this way, the load balancer host 315 can execute load balancing functionality upon the encrypted data packet 350. For example, the load balancer host 315 determines that encrypted data packet 350 is to be routed to the service hosted by the destination computing node 335.

Instead of merely load balancing and forwarding the encrypted data packet 350 to the destination computing node 335, the encrypted data packet 350 is decrypted by a web server hosted within the container executing the load balancer 320, at 210. That is, the web server of the load balancer host 315 utilizes a certificate established between the remote computer 305 and the destination computing node 335 to decrypt the encrypted data packet 350 at the load balancer host 315. The encrypted data packet 350 is decrypted using the certificate to create an unencrypted data packet 355. In one embodiment, the secure socket layer (SSL) session is terminated for the encrypted data packet 350. The SSL session is terminated as part of decrypting the encrypted data packet 350. That is, decrypting the encrypted data packet 350 will cause the SSL session to be terminated because the encrypted data packet 350 is no longer encrypted/secure.

Figure 3B:
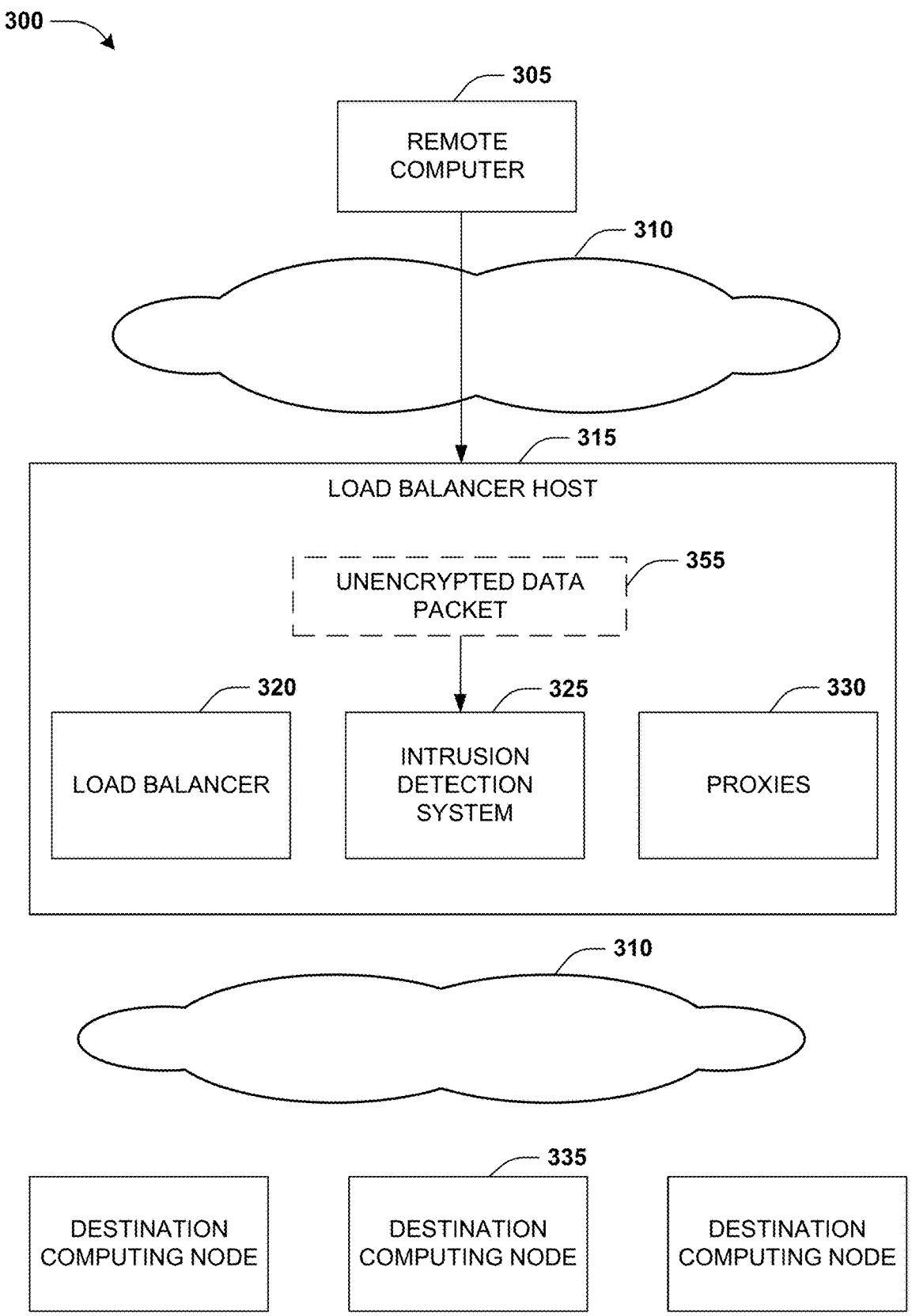
FIG. 3B illustrates an embodiment of a system that performs intrusion detection on load balanced network traffic, where intrusion detection is performed upon an unencrypted data packet.

At 215, the unencrypted data packet 355 is routed to the intrusion detection system 325, as illustrated by FIG. 3B. In one embodiment, an internet protocol (IP) table rule will mirror the unencrypted data packet to the intrusion detection system 325 over the IP vlan 175 between the container hosting the load balancer 320 and a second container hosting the intrusion detection system 325. That is, the IP table rule is executed to capture encrypted data packets at a toids vlan interface of the container and route those unencrypted data packets to the intrusion detection system 325 over the IP vlan 175. For example, the IP table rule may specify that any encrypted data packets are to be mirrored and routed to the intrusion detection system 325. The intrusion detection system 325 is controlled to execute intrusion detection functionality upon the unencrypted data packet 355. The intrusion detection functionality is executed to determine whether the unencrypted data packet 355 is associated with safe or malicious activity.

Because the unencrypted data packet 355 is internally routed within the load balancer host 315 to the intrusion detection system 325 over the IP vlan 175 network, there is no unsecure/unencrypted data transmission over the network 310. The unencrypted data packets are kept internal to the load balancer host 315. Thus, the service level agreement is not violated. The intrusion detection system 325 is able to adequately perform the intrusion detection because the content of the decrypted data packet 355 is accessible for inspection. Otherwise, the intrusion detection system 325 would be unable to perform intrusion detection upon the encrypted data packet 350 (e.g., at an application layer), whose content is not accessible for inspection.

Figure 3C:
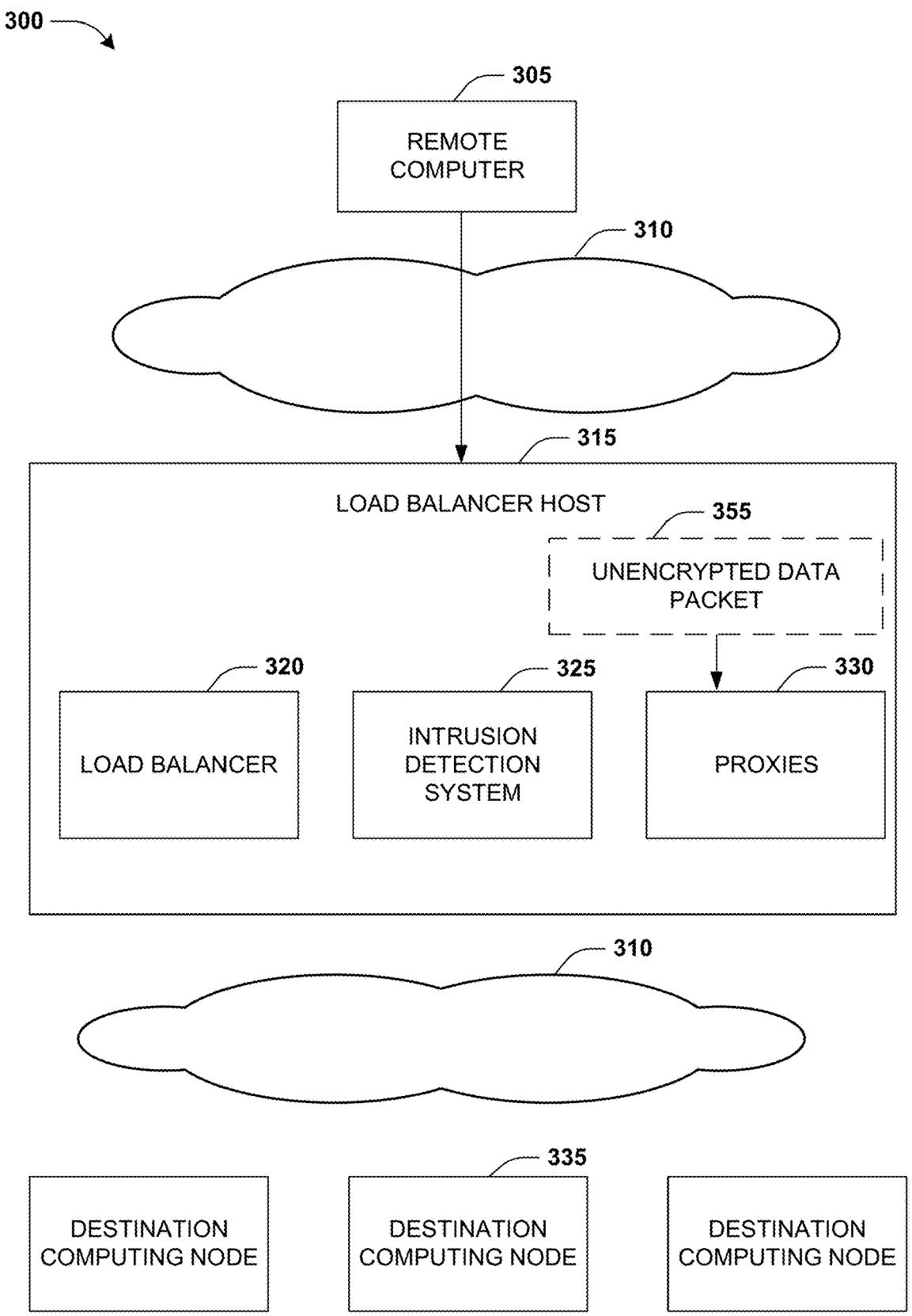
FIG. 3C illustrates an embodiment of a system that performs intrusion detection on load balanced network traffic, where an unencrypted data packet is transmitted to a proxy.

The IP table rule is also executed to route the unencrypted data packet 355 to a proxy associated with the destination computing node 335, as illustrated by FIG. 3C. That is, the IP table rule maps proxies to corresponding destination computing nodes. The IP table rule can use this mapping to determine which proxy should be used to route a data packet to a corresponding destination computing node. This is done by evaluating a data packet to identify a destination IP and/or port of a destination computing node that is the destination of the data packet. The destination IP and/or port of the destination computing node is looked up in the mapping to identify a proxy mapped to the destination IP and/or port (mapped to the destination computing node). In this way, the IP table rule will route the data packet to that proxy. For example, when the IP table rule is executed upon the unencrypted data packet 355 destined for the destination computing node 335, the IP table rule will evaluate the unencrypted data packet 355 to identify a destination IP and/or port, which corresponds to the destination computing node 335. The IP table rule will determine that the destination computing node 335 is mapped to the proxy (e.g., the destination IP and/or port of the destination computing node 335 is mapped to the proxy). In this way, the IP table rule routes the unencrypted data packet 355 to the proxy mapped to the destination computing node 335.

In one embodiment, the load balancer host 315 is configured with a list of backend IP addresses of proxies 330 hosted by the load balancer host 315. The load balancer host 315 will utilize corresponding proxies 330 to perform secure data transmission. In particular, each proxy is associated with a corresponding computing node of the network of computing nodes. For example, there is the proxy mapped to the destination computing node 335, another proxy mapped to a different destination computing node, etc. The load balancer host 315 will use the IP table rule and a backend IP address of the proxy for the destination computing node 335 to route the unencrypted data packet 355 to the proxy.

Figure 3D:
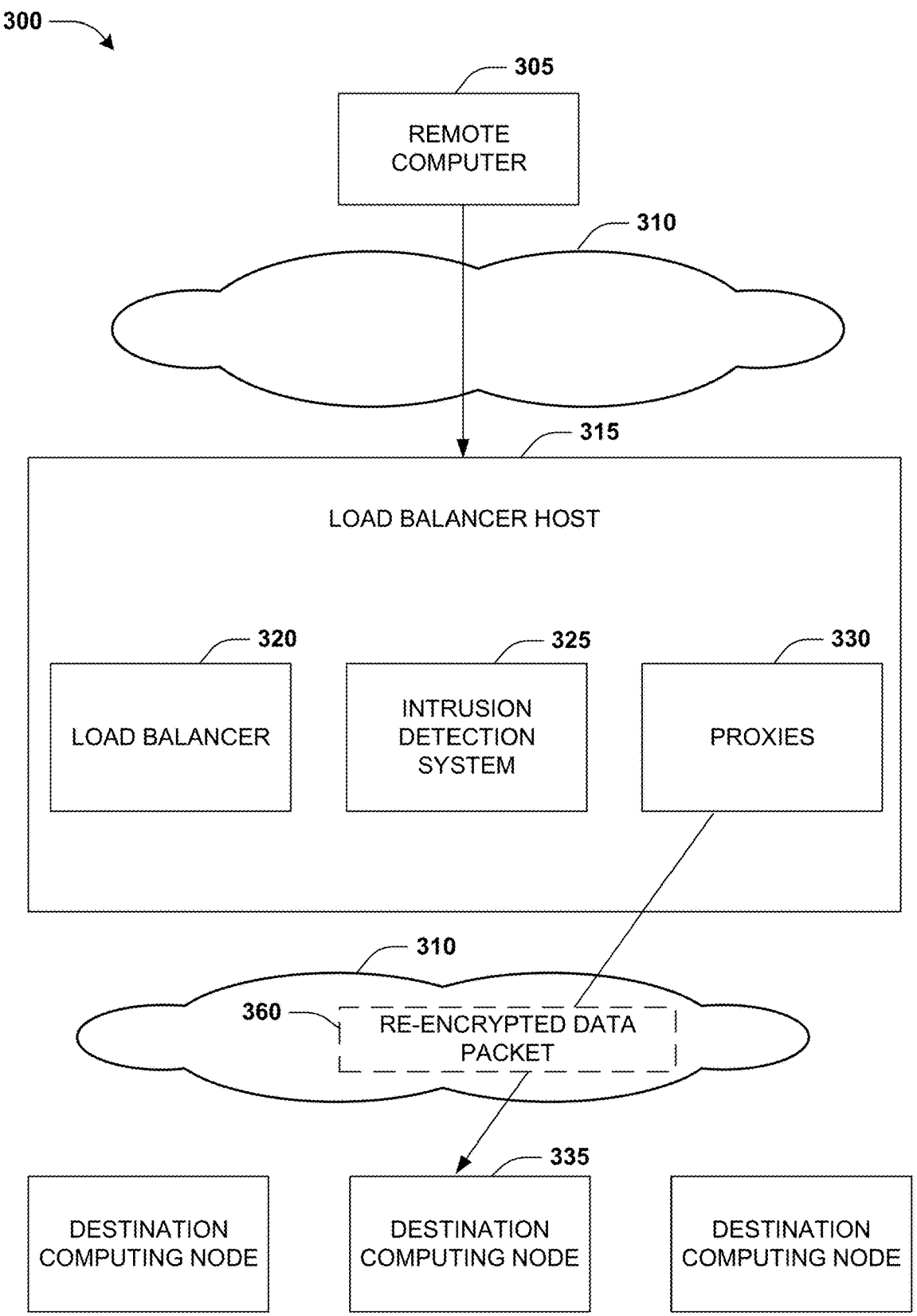
FIG. 3D illustrates an embodiment of a system that performs intrusion detection on load balanced network traffic, where a proxy transmits a re-encrypted data packet.

The original secure connection between the remote computer 305 and the destination computing node 340 was terminated when the encrypted data packet 350 was decrypted. The original secure connection was terminated because the encrypted data packet 350 was no longer encrypted/secure, and thus the original secure connection was no longer valid. Accordingly, at 220, the proxy is controlled to encrypt the unencrypted data packet to create an encrypted data packet 360, as illustrated by FIG. 3D. As part of the encryption process, the proxy will establish a new secure connection with the destination computing node 335. In one embodiment, the proxy and the destination computing node 335 create a new SSL connection and establish certificates associated with the SSL connection. The certificates can be used by the proxy and the destination computing node 335 to encrypt and decrypt data packets. Thus, the proxy uses a certificate to encrypt the unencrypted data packet 355 to create the encrypted data packet 360. The proxy is controlled to transmit the encrypted data packet 360 over the network 310 to the destination computing node 335 for processing by the service.

Because the proxy and the destination computing node 335 establish the new secure connection, data packets transmitted over the network 310 between computing nodes of the network of computing nodes will be encrypted. Ensuring secure transmission of encrypted data packets improves security provided by the network of computing nodes and enforces the service level agreement provided for the remote computer 305. Enforcing secure transmission is achieved because unencrypted data packets are not transmitted between computing nodes over the network 310. Instead, unencrypted data packets are only routed internally within the load balancer host 315, such as to the intrusion detection system 325 and the proxy. Because the intrusion detection system 325 and the proxy are all hosted within the same load balancer host 315, there is no transmission of unencrypted data packets over the network 310.

Furthermore, security is also enhanced because intrusion detection can be performed as the load balancer host 315 receives data packets from remote computers. Because the load balancer host 315 has access to the certificate associated with the secure connection between the remote computer 305 and the destination computing node 335, encrypted data packets can be unencrypted. The encrypted data packets are unencrypted at the load balancer host 315 hosting the intrusion detection system 325. In this way, the intrusion detection system 325 can locally perform intrusion detection at the load balancer host 315 upon the unencrypted data packets. Otherwise, intrusion detection could not be locally performed if the data packets were still encrypted. This is because intrusion detection cannot be adequately performed upon encrypted data packets.

The ability to locally perform intrusion detection, at the load balancer host 315 that is receiving and load balancing data packets from remote computers, will enhance security.

This is because unencrypted data packets are not being transmitted to a separate computing node hosting the intrusion detection system 325. Also, data packets that are malicious will be identified upfront instead of being further routed through the network to the separate computing node hosting the intrusion detection system 325. Further, there is no need to maintain additional hardware to separately host the intrusion detection system 325 on the separate computing node, which can be costly.

Figure 4:
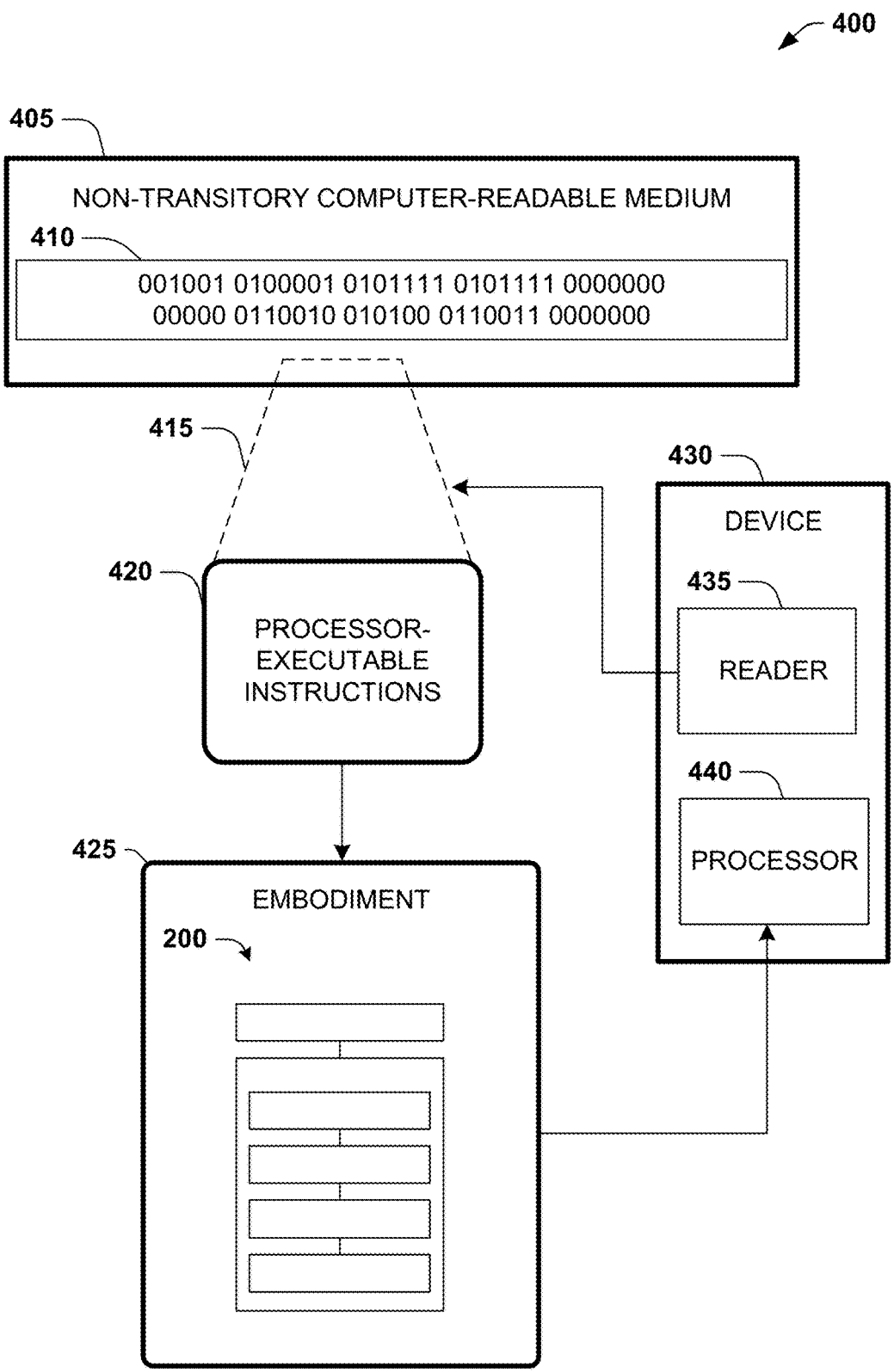
FIG. 4 illustrates an embodiment of a non-transitory computer-readable medium.

FIG. 4 is an illustration of a scenario 400 involving an example non-transitory computer-readable medium 405. In one embodiment, one or more of the components described herein are configured as program modules stored in the non-transitory computer-readable medium 405. The program modules are configured with stored instructions, such as processor-executable instructions 420, that when executed by at least a processor, such as processor 440, cause the computing device to perform the corresponding function(s) as described herein. In one embodiment, the, functionality of a module implemented as a load balancer, stored in the non-transitory computer-readable medium 405, may be executed by the processor 440 as the processor-executable instructions 420 to perform an embodiment 425 of the method 200 of FIG. 2.

The non-transitory computer-readable medium 405 includes the processor-executable instructions 420 that when executed by a processor 440 cause performance of at least some of the provisions herein. The non-transitory computer-readable medium 405 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 405 stores computer-readable data 410 that, when subjected to reading 415 by a reader 435 of a device 430 (e.g., a read head of a hard disk drive, or a read operation invoked on a solid-state storage device), express the processor-executable instructions 420.

In some embodiments, the processor-executable instructions 420, when executed cause performance of operations, such as at least some of the example method 200 of FIG. 2, for example. In some embodiments, the processor-executable instructions 420 are configured to cause implementation of a system, such as at least some of the example system 100 of FIGS. 1A and 1B, for example.

Figure 5:
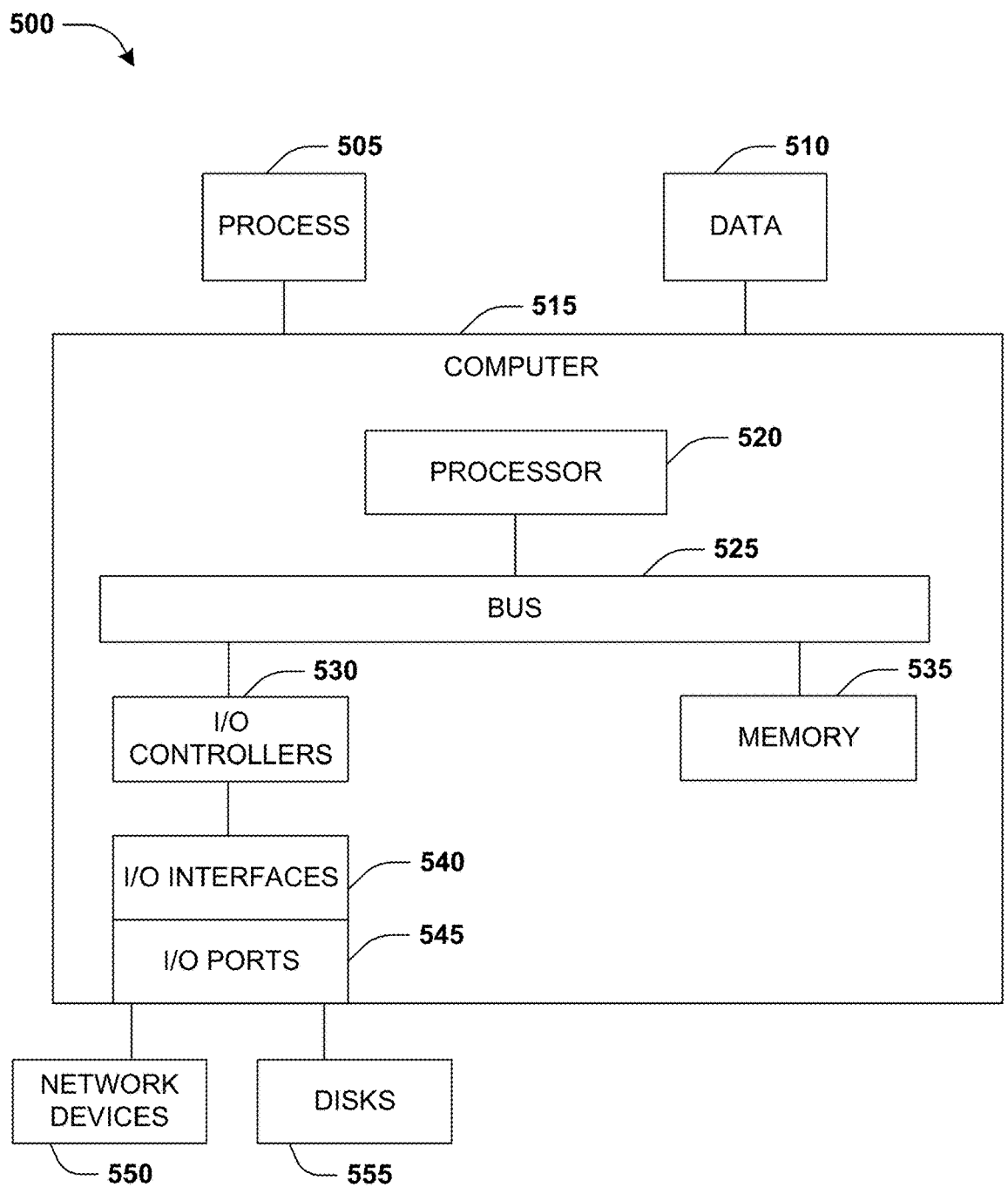
FIG. 5 illustrates an embodiment of a computing system configured with the example systems and/or methods disclosed.

FIG. 5 illustrates one embodiment of a special purpose computing system 500 that is configured and/or programmed with one or more of the example systems and methods described herein, and/or equivalents. In one embodiment, the computer 515 is a load balancer configured to perform intrusion detection upon load balanced network traffic. The computing system 500 may include at least the computer 515 that includes a processor 520, a memory 535, and I/O ports 545 operably connected by a bus 525. In one embodiment, the computer 515 may include logic configured to facilitate the system 100 and/or the method 200 shown in FIGS. 1-2. In different embodiments, the logic may be implemented in hardware, a non-transitory computer-readable medium 505 with stored instructions, firmware, and/or combinations thereof. While the logic could be implemented as a hardware component attached to the bus 525, it is to be appreciated that in other embodiments, the logic could be implemented in the processor 520, stored in memory 535, or stored in disk 555.

In one embodiment, logic or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 515 as data 510 that are temporarily stored in memory 535 and then executed by processor 520.

The logic may also provide means (e.g., hardware, non-transitory computer-readable medium 505 that stores executable instructions, firmware) for performing rule based source sequencing for allocation.

Generally describing an example configuration of the computer 515, the processor 520 may be a variety of various processors including dual microprocessor and other multi-processor architectures. The memory 535 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 555 may be operably connected to the computer 515 via, for example, the I/O interface 540 (e.g., card, device) and the I/O ports 545. The disks 555 may be, for example, a magnetic disk drive, a solid state disk drive, a floppy disk drive, a tape drive, a Zip drive, a flash memory card, a memory stick, and so on. Furthermore, the disks 555 may be a CD-ROM drive, a CD-R drive, a CD-RW drive, a DVD ROM, and so on. The memory 535 can store a process, such as within the non-transitory computer-readable medium 505, and/or data 510, for example. The disk 555 and/or the memory 535 can store an operating system that controls and allocates resources of the computer 515.

The computer 515 may interact with input/output (I/O) devices via the I/O interfaces 540 and the I/O ports 545. The I/O devices may be, for example, a keyboard, a microphone, a pointing and selection device, cameras, video cards, displays, the disks 555, the network devices 550, and so on. The I/O ports 545 may include, for example, serial ports, parallel ports, and USB ports. I/O controllers 530 may connect the I/O interfaces 540 to the bus 525.

The computer 515 can operate in a network environment and thus may be connected to the network devices 550 via the I/O interfaces 540, and/or the I/O ports 545. Through the network devices 550, the computer 515 may interact with a network. Through the network, the computer 515 may be logically connected to remote computers (e.g., the computer 515 may reside within a distributed computing environment to which clients may connect). Networks with which the computer 515 may interact include, but are not limited to, a local area network (LAN), a new area network (WAN), and other networks.

Figure 6:
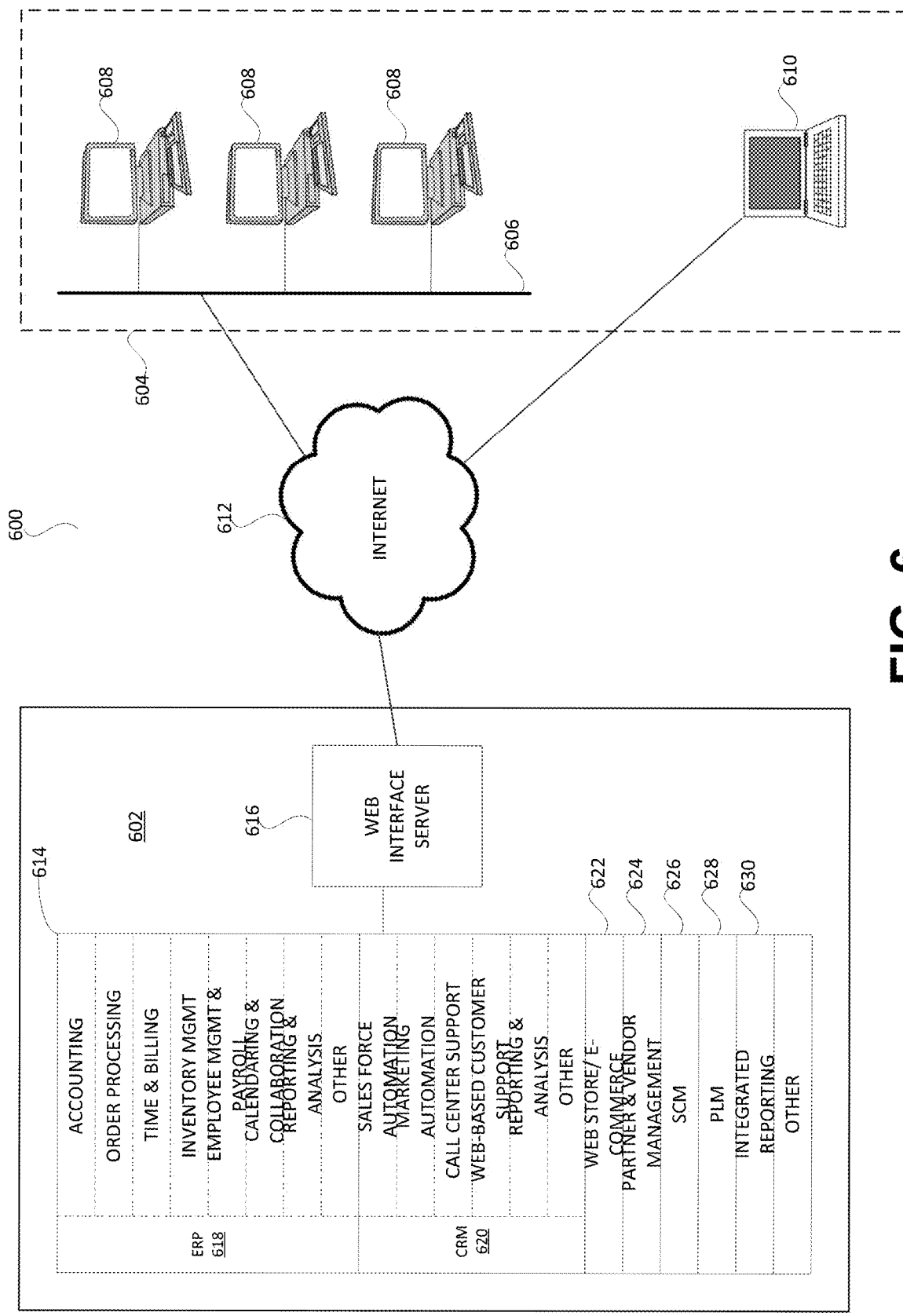
FIG. 6 illustrates an embodiment of an integrated business system and an enterprise network in which an embodiment of the invention may be implemented.

FIG. 6 is a diagram illustrating a system 600 in which an embodiment of the invention may be implemented. Enterprise network 604 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection.

For simplicity and clarity of explanation, the enterprise network 604 is represented by an on-site local area network 606 to which a plurality of personal computers 608 are connected, each generally dedicated to a particular end user, such as a service agent or other employee (although such dedication is not required), along with an exemplary remote user computer 610 that can be, for example, a laptop computer or tablet computer of a traveling employee having internet access through a public Wi-Fi access point, or other internet access method. The end users (consumers) associated with computers 608 and 610 may possess an internet-enabled smartphone or other electronic device (such as a PDA, tablet, laptop computer) having wireless internet access or other synchronization capabilities. Users of the enterprise network 604 interface with the integrated business system 602 across the Internet 612 or another suitable communications network or combination of networks.

Integrated business system 602, which may be hosted by a dedicated third party, may include an integrated business server 614 and a web interface server 616, coupled as shown in FIG. 6. It is to be appreciated that either or both of the integrated business server 614 and the web interface server 616 may be implemented on one or more different hardware systems and components, even though represented as singular units in FIG. 6.

In a typical example in which system 602 is operated by a third party for the benefit of multiple account owners/tenants, each of whom is operating a business, integrated business server 614 comprises an ERP module 618 and further comprises a CRM module 620. In many cases, it will be desirable for the ERP module 618 to share methods, libraries, databases, subroutines, variables, etc., with CRM module 620, and indeed ERP module 618 may be intertwined with CRM module 620 into an integrated Business Data Processing Platform (which may be single tenant, but is typically multi-tenant).

The ERP module 618 may include, but is not limited to, a finance and accounting module, an order processing module, a time and billing module, an inventory management and distribution module, an employee management and payroll module, a calendaring and collaboration module, a reporting and communication module, and other ERP-related modules. The CRM module 620 may include, but is not limited to, a sales force automation (SFA) module, a marketing automation module, a contact list module (not shown), a call center support module, a web-based customer support module, a reporting and communication module, and other CRM-related modules.

The integrated business server 614 (or multi-tenant data processing platform) further may provide other business functionalities including a web store/eCommerce module 622, a partner and vendor module 624, and an integrated reporting module 630. An SCM (supply chain management) module 626 and PLM (product lifecycle management) module 628 may also be provided. Web interface server 616 is configured and adapted to interface with the integrated business server 614 to provide one or more web-based user interfaces to end users of the enterprise network 604.

The integrated business system shown in FIG. 6 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 7:
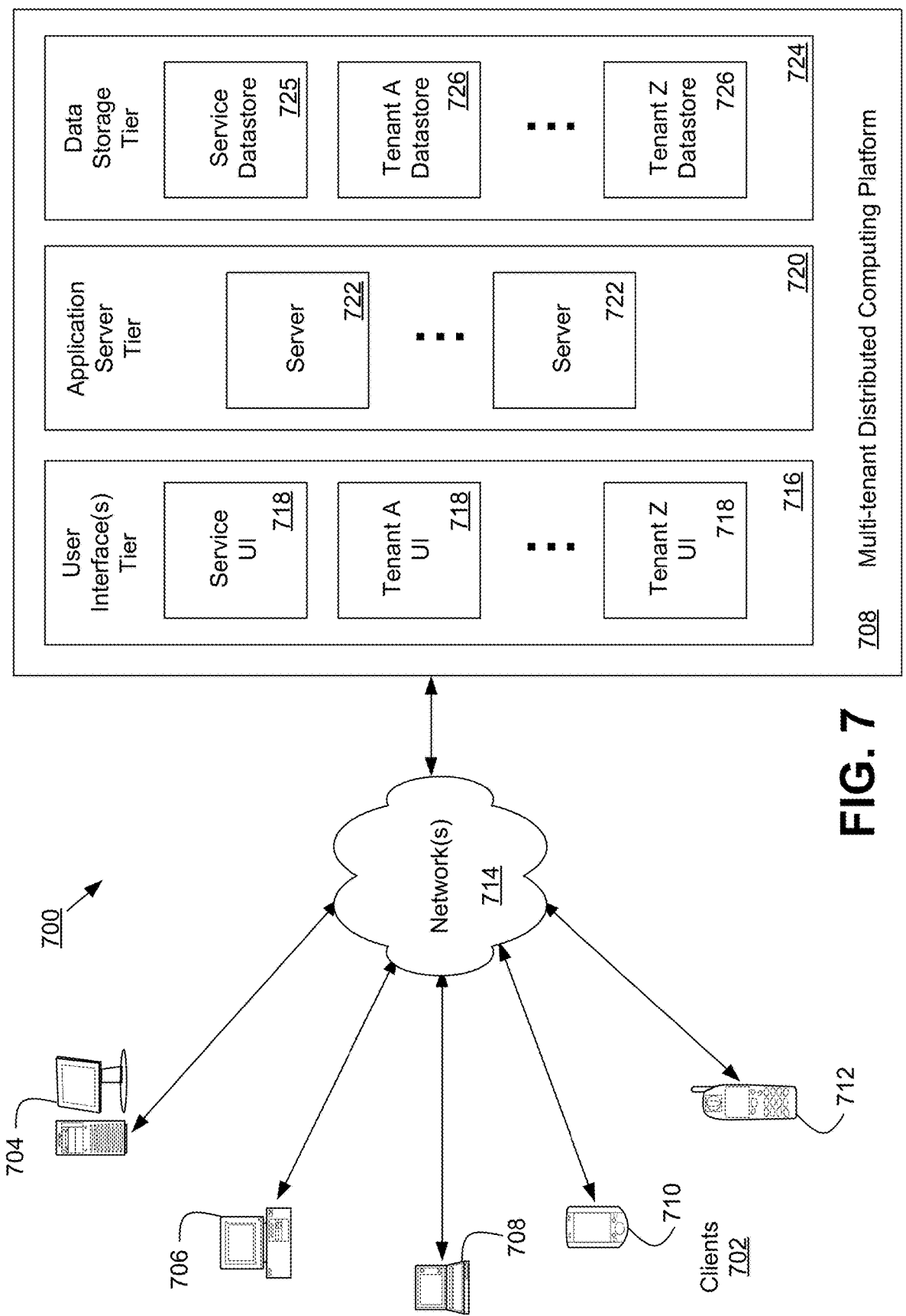
FIG. 7 illustrates an embodiment of a multi-tenant distributed computing service platform.

FIG. 7 is a diagram illustrating elements or components of an example operating environment 700 in which an embodiment of the invention may be implemented. As shown, a variety of clients 702 incorporating and/or incorporated into a variety of computing devices may communicate with a distributed computing service/platform 708 through one or more networks 714. For example, a client may incorporate and/or be incorporated into a client application (e.g., software) implemented at least in part by one or more of the computing devices.

Examples of suitable computing devices include specially programmed or configured personal computers, server computers 704, desktop computers 706, laptop computers 708, notebook computers, tablet computers or personal digital assistants (PDAs) 710, smart phones 712, cell phones, and consumer electronic devices incorporating one or more computing device components, such as one or more electronic processors, microprocessors, central processing units (CPU), or controllers that are specially programmed with instructions for implemented one or more embodiments as disclosed herein. Examples of suitable networks 714 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 708 may include multiple processing tiers, including a user interface tier 716, an application server tier 720, and a data storage tier 724. The user interface tier 716 may maintain multiple user interfaces 718, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions.

The data storage tier 724 may include one or more data stores, which may include a Service Data store 725 and one or more Tenant Data stores 726.

Each tenant data store 726 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 708 may be multi-tenant and service platform 708 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 722 that are part of the platform's Application Server Tier 720.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions.

In addition to ERP and CRM functions, a business information system/platform (such as element 708 of FIG. 7(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 722 that are part of the platform's Application Server Tier 720.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 708 of FIG. 7).

As noted with regards to FIG. 6, the integrated business system shown in FIG. 7 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a load balancer host causes the processor to:
    establish a first execution environment in a first container within the load balancer host and execute code of a load balancer that performs load balancing within the first container;
    establish a second execution environment in a second container within the load balancer host and execute an intrusion detection system within the second container;
    wherein the load balancer of the first container and intrusion detection system of the second container communicate internally within the load balancer host via a local area network;
    perform load balancing upon network traffic that is received and transmitted as encrypted data packets over a network of computing nodes by the load balancer executing on the load balancer host;
    receive an encrypted data packet from a remote computer, wherein the encrypted data packet is to be transmitted to a destination service hosted by a destination computing node of the network;
    utilize a certificate established between the remote computer and the destination service to decrypt the encrypted data packet to create an unencrypted data packet;
    route the unencrypted data packet over the local area network from the first container to the intrusion detection system executing on the load balancer host in the second container to maintain the unencrypted data packet internal to the load balancer host, and control the intrusion detection system to execute intrusion detection upon the unencrypted data packet to detect whether the unencrypted data packet corresponds to malicious activity;
    establish a secure connection with the destination computing node; and
    encrypt the unencrypted data packet to create a re-encrypted data packet and transmit the re-encrypted data packet using the secure connection over the network to the destination computing node for processing by the destination service.

2. The non-transitory computer-readable medium of claim 1, wherein the instructions further comprise instructions to:
    enforce a service level agreement specifying that data packets transmitted over the network between the remote computer and the destination computing node are to retain encryption during transmission over the network between computing nodes.

3. The non-transitory computer-readable medium of claim 1, wherein the instructions further comprise instructions to:
    control a proxy to establish the secure connection with the destination computing node and transmit the encrypted data packet to the destination computing node using the secure connection.

4. The non-transitory computer-readable medium of claim 1, wherein the instructions further comprise instructions to:
    configure the load balancer with a front end internet protocol (IP) address for receiving encrypted data packets from remote computers; and
    configure the load balancer with a list of backend IP addresses of proxies hosted by the load balancer host, wherein the proxies are controlled to establish secure connections with computing nodes of the network for transmitting encrypted data packets to the computing nodes, wherein there is a one-to-one correlation between proxies and computing nodes.

5. The non-transitory computer-readable medium of claim 4, wherein the instructions further comprise instructions to:
control the load balancer to (i) decrypt data packets received from the front end IP address and (ii) forward the unencrypted data packets to proxies utilizing the list of backend IP addresses, wherein unencrypted data packets are forwarded to proxies associated with destination computing nodes of the unencrypted data packets.

6. The non-transitory computer-readable medium of claim 1, wherein the instructions to decrypt further comprise instructions to:
terminate a secure socket layer (SSL) session of the encrypted data packet.

7. The non-transitory computer-readable medium of claim 1, wherein the instructions further comprise instructions to:
control a proxy to execute an internet protocol (IP) table rule to mirror unencrypted data packets to the intrusion detection system.

8. A load balancer host, comprising:
a processor connected to memory; and
a module stored on a non-transitory computer readable medium and configured with instructions that when executed by the processor cause the processor to:
establish a first execution environment in a first container within the load balancer host and execute code of a load balancer that performs load balancing within the first container;
establish a second execution environment in a second container within the load balancer host and execute an intrusion detection system within the second container;
wherein the load balancer of the first container and intrusion detection system of the second container communicate internally within the load balancer host via a local area network;
perform load balancing upon network traffic that is received and transmitted as encrypted data packets over a network of computing nodes by the load balancer executing on the load balancer host;
receive an encrypted data packet from a remote computer, wherein the encrypted data packet is to be transmitted to a destination service hosted by a destination computing node of the network;
utilize a certificate established between the remote computer and the destination service to decrypt the encrypted data packet to create an unencrypted data packet;
route the unencrypted data packet over the local area network from the first container to the intrusion detection system executing on the load balancer host in the second container to maintain the unencrypted data packet internal to the load balancer host, and control the intrusion detection system to execute intrusion detection upon the unencrypted data packet to detect whether the unencrypted data packet corresponds to malicious activity;
establish a secure connection with the destination computing node; and
encrypt the unencrypted data packet to create a re-encrypted data packet and transmit the re-encrypted data packet using the secure connection over the network to the destination computing node for processing by the destination service.

9. The load balancer host of claim 8, wherein the instructions further comprise instructions that cause the processor to:
enforce a service level agreement specifying that data packets transmitted over the network between the remote computer and the destination computing node are to retain encryption during transmission over the network between computing nodes.

10. The load balancer host of claim 8, wherein the instructions further comprise instructions that cause the processor to:
control a proxy to establish the secure connection with the destination computing node and transmit the encrypted data packet to the destination computing node using the secure connection.

11. The load balancer host of claim 8, wherein the instructions further comprise instructions that cause the processor to:
configure the load balancer with a front end internet protocol (IP) address for receiving encrypted data packets from remote computers; and
configure the load balancer with a list of backend IP addresses of proxies hosted by the load balancer, wherein the proxies are controlled to establish secure connections with computing nodes of the network for transmitting encrypted data packets to the computing nodes, wherein there is a one-to-one correlation between proxies and computing nodes.

12. The load balancer host of claim 11, wherein the instructions comprise further instructions that cause the processor to:
control the load balancer to (i) decrypt data packets received from the front end IP address and (ii) forward the unencrypted data packets to proxies utilizing the list of backend IP addresses, wherein unencrypted data packets are forwarded to proxies associated with destination computing nodes of the unencrypted data packets.

13. A computer-implemented method comprising:
establish a first execution environment in a first container within the load balancer host and execute code of a load balancer that performs load balancing within the first container;
establish a second execution environment in a second container within the load balancer host and execute an intrusion detection system within the second container;
wherein the load balancer of the first container and intrusion detection system of the second container communicate internally within the load balancer host via a local area network;
performing, by a processor of a load balancer host, load balancing upon network traffic that is received and transmitted as encrypted data packets over a network of computing nodes by the load balancer executing on the load balancer host;
receiving, by the processor of the load balancer host, an encrypted data packet from a remote computer, wherein the encrypted data packet is to be transmitted to a destination service hosted by a destination computing node of the network;
utilizing, by the processor of the load balancer host, a certificate established between the remote computer and the destination service to decrypt the encrypted data packet to create an unencrypted data packet;
routing, by the processor of the load balancer host, the unencrypted data packet over the local area network from the first container to the to an intrusion detection system executing on the load balancer host in the second container to maintain the unencrypted data packet internal to the load balancer host, and control the intrusion detection system to execute intrusion detection upon the unencrypted data packet to detect whether the unencrypted data packet corresponds to malicious activity;

establishing, by the processor of the load balancer host, a secure connection with the destination computing node; and encrypting, by the processor of the load balancer host, the unencrypted data packet to create a re-encrypted data packet and transmitting the re-encrypted data packet using the secure connection over the network to the destination computing node for processing by the destination service.

14. The computer-implemented method of claim 13, further comprising:

enforcing a service level agreement specifying that data packets transmitted over the network between the remote computer and the destination computing node are to retain encryption during transmission over the network between computing nodes.

15. The computer-implemented method of claim 13, further comprising:

controlling a proxy to establish the secure connection with the destination computing node and transmit the encrypted data packet to the destination computing node using the secure connection.

16. The computer-implemented method of claim 13, further comprising:

configuring the load balancer with a front end internet protocol (IP) address for receiving encrypted data packets from remote computers; and configuring the load balancer with a list of backend IP addresses of proxies hosted by the load balancer, wherein the proxies are controlled to establish secure connections with computing nodes of the network for transmitting encrypted data packets to the computing nodes, wherein there is a one-to-one correlation between proxies and computing nodes.

17. The computer-implemented method of claim 16, further comprising:

controlling the load balancer to (i) decrypted data packets received from the front end IP address and (ii) forward the unencrypted data packets to proxies utilizing the list of backend IP addresses, wherein unencrypted data packets are forwarded to proxies associated with destination computing nodes of the unencrypted data packets.

* * * * *

UNITED STATES PATENT AND TRADEMARK OFFICE
CERTIFICATE OF CORRECTION

PATENT NO. : 10,944,769 B2
APPLICATION NO. : 16/140957
DATED : March 9, 2021
INVENTOR(S) : Singh Page 1 of 1

It is certified that error appears in the above-identified patent and that said Letters Patent is hereby corrected as shown below:

In the Claims

In Column 22, Line 64, in Claim 13, after "to the" delete "to an".

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*